(12) United States Patent
Xu et al.

(10) Patent No.: US 11,816,710 B2
(45) Date of Patent: *Nov. 14, 2023

(54) IDENTIFYING KEY-VALUE PAIRS IN DOCUMENTS

(71) Applicant: Google LLC, Mountain View, CA (US)

(72) Inventors: Yang Xu, San Jose, CA (US); Jiang Wang, Santa Clara, CA (US); Shengyang Dai, Dublin, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,097

(22) Filed: Mar. 1, 2022

(65) Prior Publication Data
US 2022/0309549 A1   Sep. 29, 2022

Related U.S. Application Data

(63) Continuation of application No. 16/802,864, filed on Feb. 27, 2020, now Pat. No. 11,288,719.

(60) Provisional application No. 62/811,331, filed on Feb. 27, 2019.

(51) Int. Cl.
*G06V 30/142* (2022.01)
*G06Q 30/04* (2012.01)
*G06V 30/412* (2022.01)
*G06V 30/414* (2022.01)

(52) U.S. Cl.
CPC .......... *G06Q 30/04* (2013.01); *G06V 30/412* (2022.01); *G06V 30/414* (2022.01)

(58) Field of Classification Search
CPC .... G06Q 30/04; G06V 30/412; G06V 30/414; G06N 3/08
See application file for complete search history.

(56) References Cited

U.S. PATENT DOCUMENTS 10,521,477 B1 * 12/2019 Wells ................. G06F 16/9038
10,872,236 B1 * 12/2020 Elor ................... G06V 30/1452
10,896,357 B1 *  1/2021 Corcoran ............. G06F 18/217
(Continued)

OTHER PUBLICATIONS

Aws.amazon.com [online], "Amazon Textract" Nov. 2018, [retrieved on Feb. 27, 2020], retrieved from: URL <https://aws.amazon.com/textract/>, 9 pages.

*Primary Examiner* — Ming Y Hon
(74) *Attorney, Agent, or Firm* — Honigman LLP; Brett A. Krueger

(57) ABSTRACT

Methods, systems, and apparatus, including computer programs encoded on a computer storage medium, for converting unstructured documents to structured key-value pairs. In one aspect, a method includes: providing an image of a document to a detection model, wherein: the detection model is configured to process the image to generate an output that defines one or more bounding boxes generated for the image; and each bounding box generated for the image is predicted to enclose a key-value pair including key textual data and value textual data, wherein the key textual data defines a label that characterizes the value textual data; and for each of the one or more bounding boxes generated for the image: identifying textual data enclosed by the bounding box using an optical character recognition technique; and determining whether the textual data enclosed by the bounding box defines a key-value pair.

20 Claims, 5 Drawing Sheets

(56) References Cited

U.S. PATENT DOCUMENTS

| | | | |
|---|---|---|---|
| 11,288,719 B2* | 3/2022 | Xu | G06Q 30/04 |
| 2013/0236112 A1* | 9/2013 | Oka | H03M 7/3062 |
| | | | 382/232 |
| 2017/0286765 A1* | 10/2017 | Rodriguez | G06V 30/416 |
| 2019/0171872 A1* | 6/2019 | Northrup | G06V 30/274 |
| 2020/0074169 A1* | 3/2020 | Mukhopadhyay | G06F 18/22 |

* cited by examiner

CUSTOMER INVOICE

DATE: 2-23-2019

TIME: 17:30:22

INVOICE #: 7124

XYZ GENERAL CONTRACTING

PHONE: 123-456-7890

EMAIL: SALES@XYZ.COM

WEB: WWW.XYZ.COM

PLEASE SHOW OUR INVOICE NUMBER ON YOUR REMITTANCE

PLUMBING MAINTENANCE - $670 LABOR - $212 PARTS

AMOUNT DUE: $882 USD

PAYMENT DUE BY: 2-28-2019

THANK YOU FOR YOUR BUSINESS!

CUSTOMER INVOICE

DATE: 2-23-2019 — 202

TIME: 17:30:22 — 206

INVOICE #: 7124 — 210

XYZ GENERAL CONTRACTING

PHONE: 123-456-7890 — 204

EMAIL: SALES@XYZ.COM — 208

WEB: WWW.XYZ.COM — 212

PLEASE SHOW OUR INVOICE NUMBER ON YOUR REMITTANCE

PLUMBING MAINTENANCE - $670 LABOR - $212 PARTS

AMOUNT DUE: $882 USD — 214

PAYMENT DUE BY: 2-28-2019 — 216

THANK YOU FOR YOUR BUSINESS! — 218

FIG. 2B

| KEY | VALUE |
|---|---|
| DATE: | 2-23-2019 |
| TIME: | 17:30:22 |
| INVOICE #: | 7124 |
| PHONE: | 123-456-7890 |
| EMAIL: | SALES@XYZ.COM |
| WEB: | WWW.XYZ.COM |
| AMOUNT DUE: | $882 USD |
| PAYMENT DUE BY: | 2-28-2019 |

IDENTIFYING KEY-VALUE PAIRS IN DOCUMENTS

CROSS REFERENCE TO RELATED APPLICATIONS

This U.S. patent application is a continuation of, and claims priority under 35 U.S.C. § 120 from, U.S. patent application Ser. No. 16/802,864, filed on Feb. 27, 2020, which claims priority under 35 U.S.C. § 119(e) to U.S. Provisional Application 62/811,331, filed on Feb. 27, 2019. The disclosures of these prior applications are considered part of the disclosure of this application and are hereby incorporated by reference in their entireties.

TECHNICAL FIELD

This disclosure relates to document processing.

BACKGROUND

Understanding documents (e.g., invoices, pay stubs, purchase receipts, and the like) is an important business need for many modern enterprises. A large fraction (e.g., 90% or more) of enterprise data is stored and represented in the form of unstructured documents. Manually extracting structured data from documents can be expensive, time-consuming, and error-prone.

SUMMARY

One aspect of the disclosure provides a parsing system and a parsing method implemented as computer programs on one or more computers in one or more locations that automatically converts unstructured documents to structured key-value pairs. More specifically, the parsing system is configured to process a document to identify "key" textual data and corresponding "value" textual data in the document. Broadly, a key defines a label that characterizes (i.e., is descriptive of) a corresponding value. For example, the key "Date" may correspond to the value "2-23-2019".

Implementations of the disclosure may include one or more of the following optional features. In some implementations, there is provided a method performed by one or more data processing apparatus, the method including: providing an image of a document to a detection model, wherein: the detection model is configured to process the image in accordance with values of a plurality of detection model parameters to generate an output that defines one or more bounding boxes generated for the image, and each bounding box generated for the image is predicted to enclose a key-value pair including key textual data and value textual data, wherein the key textual data defines a label that characterizes the value textual data; and for each of the one or more bounding boxes generated for the image: identifying textual data enclosed by the bounding box using an optical character recognition technique; determining whether the textual data enclosed by the bounding box defines a key-value pair, and in response to determining that the textual data enclosed by the bounding box defines a key-value pair, providing the key-value pair for use in characterizing the document.

In some implementations, the detection model is a neural network model.

In some implementations, the neural network model including a convolutional neural network.

In some implementations, the neural network model is trained on a set of training examples, each training example includes a training input and a target output, the training input including a training image of a training document, and the target output includes data defining one or more bounding boxes in the training image that each enclose a respective key-value pair.

In some implementations, the document is an invoice.

In some implementations, providing an image of a document to a detection model includes: identifying a particular class of the document; and providing the image of the document to a detection model that is trained to process documents of the particular class.

In some implementations, determining whether the textual data enclosed by the bounding box defines a key-value pair includes: determining that the textual data enclosed by the bounding box includes a key from a predetermined set of valid keys; identifying a type of a portion of textual data enclosed by the bounding box that does not include the key; identifying a set of one or more valid types for values corresponding to the key; and determining that the type of the portion of the textual data enclosed by the bounding box that does not include the key is included in the set of one or more valid types for values corresponding to the key.

In some implementations, identifying a set of one or more valid types for values corresponding to the key includes: mapping the key to the set of one or more valid types for values corresponding to the key using a predetermined mapping.

In some implementations, the set of valid keys and the mapping from keys to corresponding sets of valid types for values corresponding to the keys are provided by a user.

In some implementations, the bounding boxes have a rectangular shape.

In some implementations, the method further includes: receiving the document from a user; and converting the document to the image, wherein the image depicts the document.

According to another aspect, there is provided a method performed by one or more data processing apparatus, the method includes: providing an image of a document to a detection model configured to process the image to identify in the image one or more bounding boxes predicted to enclose a key-value pair includes key textual data and value textual data, wherein the key defines a label that characterizes a value corresponding to the key; for each of the one or more bounding boxes generated for the image, identifying textual data enclosed by the bounding box using an optical character recognition technique and determining whether the textual data enclosed by the bounding box defines a key-value pair; and outputting the one or more key-value pair for use in characterizing the document.

In some implementations, the detection model is a machine learning model having a set of parameters that can be trained on a set of training data.

In some implementations, the machine learning model includes a neural network model, in particular a convolutional neural network.

In some implementations, the machine learning model is trained on a set of training examples, each training example includes a training input and a target output, the training input includes a training image of a training document, and the target output includes data defining one or more bounding boxes in the training image that each enclose a respective key-value pair.

In some implementations, the document is an invoice.

In some implementations, providing an image of a document to a detection model includes identifying a particular class of the document; and providing the image of the document to a detection model that is trained to process documents of the particular class.

In some implementations, determining whether the textual data enclosed by the bounding box defines a key-value pair includes: determining that the textual data enclosed by the bounding box includes a key from a predetermined set of valid keys; identifying a type of a portion of textual data enclosed by the bounding box that does not include the key, identifying a set of one or more valid types for values corresponding to the key; and determining that the type of the portion of the textual data enclosed by the bounding box that does not include the key is included in the set of one or more valid types for values corresponding to the key.

In some implementations, identifying a set of one or more valid types for values corresponding to the key includes: mapping the key to the set of one or more valid types for values corresponding to the key using a predetermined mapping.

In some implementations, the set of valid keys and the mapping from keys to corresponding sets of valid types for values corresponding to the keys are provided by a user.

In some implementations, the bounding boxes have a rectangular shape.

In some implementations, the method further includes: receiving the document from a user; and converting the document to the image, wherein the image depicts the document.

Another aspect of the disclosure provides a system includes: one or more computers; and one or more storage devices communicatively coupled to the one or more computers, wherein the one or more storage devices store instructions that, when executed by the one or more computers, cause the one or more computers to perform operations including the operations of the previously described method. The system includes data processing hardware and memory hardware in communication with the data processing hardware. The memory hardware stores instructions that when executed on the data processing hardware cause the data processing hardware to perform operations.

According to another aspect, there are provided one or more non-transitory computer storage media storing instructions that when executed by one or more computers cause the one or more computers to perform operations including the operations of the previously described method.

Particular embodiments of the subject matter described in this specification can be implemented so as to realize one or more of the following advantages.

The system described in this specification can be used to automatically convert large numbers of unstructured documents into structured key-value pairs. Therefore, the system obviates the need for manually extracting structured data from unstructured documents, which can be expensive, time-consuming, and error prone.

The system described in this specification can identify key-value pairs in documents with a high level of accuracy (e.g., for some types of documents, with greater than 99% accuracy). Therefore, the system may be suitable for deployment in applications (e.g., processing financial documents) which require a high level of accuracy.

The system described in this specification can generalize better than some conventional systems, i.e., has improved generalization capabilities in comparison to some conventional systems. In particular, by leveraging a machine-learned detection model that is trained to recognize visual signals that distinguish key-value pairs in documents, the system can accurately identify key-value pairs independently of the specific style, structure, or content of the documents.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2A illustrates an example of an invoice document that may be provided to the parsing system.

FIG. 2B illustrates bounding boxes generated by the detection model of the parsing system.

Like reference numbers and designations in the various drawings indicate like elements.

DETAILED DESCRIPTION

Figure 1:
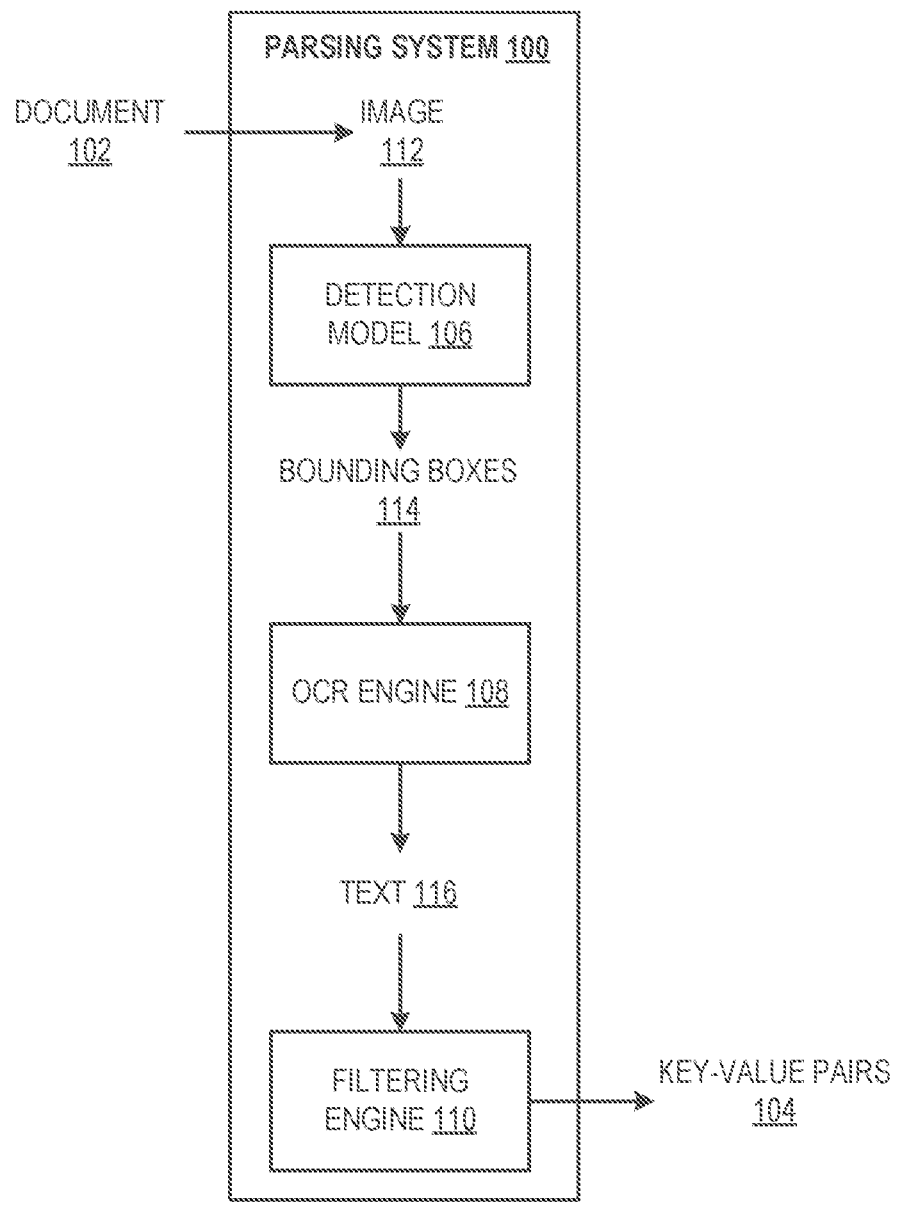
FIG. 1 shows an example parsing system.

FIG. 1 shows an example parsing system 100. The parsing system 100 is an example of a system implemented as computer programs on one or more computers in one or more locations in which the systems, components, and techniques described below are implemented.

The parsing system 100 is configured to process a document 102 (e.g., an invoice, pay stub, or purchase receipt) to identify one or more key-value pairs 104 in the document 102. A "key-value pair" refers to a key and a corresponding value, both of which are generally textual data. "Textual data" should be understood to refer to at least: alphabetical characters, numbers, and special symbols. As described earlier, a key defines a label that characterizes a corresponding value. FIGS. 2A-D illustrate examples of key-value pairs in an invoice document.

The system 100 may receive the document 102 in any of a variety of ways. For example, the system 100 can receive the document 102 as an upload from a remote user of the system 100 over a data communication network (e.g., using an application programming interface (API) made available by the system 100). The document 102 can be represented in any appropriate unstructured data format, for example, as a Portable Document Format (PDF) document or as an image document (e.g., a Portable Network Graphics (PNG) or Joint Photographic Experts Group (JPEG) document).

The system 100 uses a detection model 106, an optical character recognition (OCR) engine 108, and a filtering engine 110 to identify key-value pairs 104 in the document 102.

The detection model 106 is configured to process an image 112 of the document 102 to generate an output that defines one or more bounding boxes 114 in the image 112, each of which is predicted to enclose textual data that defines a respective key-value pair. That is, each bounding box 114 is predicted to enclose textual data that defines. (i) a key, and (ii) a value corresponding to the key. For example, a bounding box may enclose the textual data "Name: John Smith" which defines the key "Name" and the corresponding value "John Smith". The detection model 106 may be configured to generate bounding boxes 114 which each enclose a single key-value pair (i.e., rather than multiple key-value pairs).

The image 112 of the document 102 is an ordered collection of numerical values that represents the visual appearance of the document 102. For example, the image 112 may be a black-and-white image of the document. In this example, the image 112 may be represented as a two-dimensional array of numerical intensity values. As another example, the image may be a color image of the document. In this example, the image 112 may be represented a multi-channel image, where each channel corresponds to a respective color (e.g., red, green, or blue) and is represented as a two-dimensional array of numerical intensity values.

The bounding boxes 114 may be rectangular bounding boxes. A rectangular bounding box may be represented by the coordinates of a particular corner of the bounding box and the corresponding width and height of the bounding box. More generally, other bounding box shapes and other ways of representing the bounding boxes are possible.

While the detection model 106 may implicitly recognize and use any frames or borders present in the document 102 as visual signals, the bounding boxes 114 are not constrained to align (i.e., be coincident) with any existing frames of borders present in the document 102. Moreover, the system 100 may generate the bounding boxes 114 without visually displaying the bounding boxes 114 in the image 112 of the document 102. That is, the system 100 may generate data defining the bounding boxes without displaying a visual indication of the position of the bounding boxes to a user of the system 100.

The detection model 106 is generally a machine learning model, that is, a model having a set of parameters that can be trained on a set of training data. The training data includes multiple training examples, each of which include: (i) a training image that depicts a training document, and (ii) a target output that defines one or more bounding boxes that each enclose a respective key-value pair in the training image. The training data may be generated by manual annotation, that is, by a person manually identifying bounding boxes around key-value pairs in the training document (e.g., using an appropriate annotation software).

Training the detection model 106 using machine learning techniques on a set of training data enables the detection model 106 to implicitly recognize visual signals that enable it to identify key-value pairs in documents. For example, the detection model 106 may be trained to implicitly recognize both local signals (e.g., text styles and the relative spatial positions of words) and global signals (e.g., the presence of borders in the document) that enable it to identify key-value pairs. The visual signals that enable the detection model to identify key-value pairs in documents generally do not include signals representing the explicit meaning of the words in the document.

Training the detection model 106 to implicitly recognize visual signals that distinguish key-value pairs in documents enables the detection model to "generalize" beyond the training data used to train the detection model. That is, the trained detection model 106 may process an image depicting a document to accurately generate bounding boxes enclosing key-value pairs in the document even if the document was not included in the training data used to train the detection model 106.

In one example, the detection model 106 may be a neural network object detection model (e.g., including one or more convolutional neural networks), where the "objects" correspond to key-value pairs in the document. The trainable parameters of the neural network model include the weights of the neural network model, for example, weights that define convolutional filters in the neural network model.

The neural network model may be trained on the set of training data using an appropriate machine learning training procedure, for example, stochastic gradient descent. In particular, at each of multiple training iterations, the neural network model may process training images from a "batch" (i.e., a set) of training examples to generate bounding boxes predicted to enclose respective key-value pairs in the training images. The system 100 may evaluate an objective function that characterizes a measure of similarity between the bounding boxes generated by the neural network model and the bounding boxes specified by the corresponding target outputs of the training examples. The measure of similarity between two bounding boxes may be, for example, a sum of squared distances between the respective vertices of the bounding boxes. The system can determine gradients of the objective function with respect to the neural network parameter values (e.g., using backpropagation), and thereafter use the gradients to adjust the current neural network parameter values. In particular, the system 100 can use the parameter update rule from any appropriate gradient descent optimization algorithm (e.g., Adam or RMSprop) to adjust the current neural network parameter values using the gradients. The system 100 trains the neural network model until a training termination criterion is met (e.g., until a predetermined number of training iterations have been performed, or until a change in the value of the objective function between training iterations falls below a predetermined threshold).

Before using the detection model 106, the system 100 may identify a "class" of the document 102 (e.g., invoice, pay stub, or purchase receipt). For example, a user of the system 100 may identify the class of the document 102 upon providing the document to the system 100. As another example, the system 100 may use a classification neural network to automatically classify the class of the document 102. As another example, the system 100 may use OCR techniques to identify the text in the document 102, and thereafter identify the class of the document 102 based on the text in the document 102. In a particular example, in response to identifying the phrase "Net Pay", the system 100 may identify the class of the document 102 as "pay stub". In another particular example, in response to identifying the phrase "Sales tax", the system 100 may identify the class of the document 102 as "invoice". After identifying the particular class of the document 102, the system 100 may use a detection model 106 that is trained to process documents of the particular class. That is, the system 100 may use a detection model 106 that was trained on training data that included only documents of the same particular class as the document 102. Using a detection model 106 that is specifically trained to process documents of the same class as the document 102 may enhance the performance of the detection model (e.g., by enabling the detection model to generate bounding boxes around key-value pairs with greater accuracy).

For each of the bounding boxes 114, the system 100 processes the portion of the image 112 enclosed by the bounding box using the OCR engine 108 to identify the textual data (i.e., the text 116) enclosed by the bounding box. In particular, the OCR engine 108 identifies the text 116 enclosed by a bounding box by identifying each alphabetical, numerical, or special character enclosed by the bounding box. The OCR engine 108 can use any appropriate OCR technique to identify the text 116 enclosed by a bounding box 114.

The filtering engine 110 is configured to determine whether the text 116 enclosed by a bounding box 114 represents a key-value pair. The filtering engine can determine whether the text 116 enclosed by the bounding box 114 represents a key-value pair in any appropriate manner. For example, for a given bounding box, the filtering engine 110 may determine whether the text enclosed by the bounding box includes a valid key from a predetermined set of valid keys. For example, the set of valid keys may include: "Date", "Time", "Invoice #", "Amount Due", and the like. In comparing different portions of text to determine whether the text enclosed by the bounding box includes a valid key, the filtering engine 110 may determine that two portions of text are "matching" even if they are not identical. For example, the filtering engine 110 may determine that two portions of text are matching even if they include different capitalization or punctuation (e.g., the filtering system 100 may determine that "Date", "Date:", "date", and "date:" are all matching).

In response to determining that the text enclosed by the bounding box does not include a valid key from the set of valid keys, the filtering engine 110 determines that the text enclosed by the bounding box does not represent a key-value pair.

In response to determining that the text enclosed by the bounding box includes a valid key, the filtering engine 110 identifies a "type" (e.g., alphabetical, numerical, temporal) of the portion of text enclosed by the bounding box which was not identified as the key (i.e., the "non-key" text). For example, for a bounding box that encloses the text: "Date: 2-23-2019", where the filtering engine 110 identifies "Date:" as the key (as described earlier), the filtering engine 110 may identify the type of the non-key text "2-23-2019" as being "temporal".

In addition to identifying the type of the non-key text, the filtering engine 110 identifies a set of one or more valid types for values corresponding to the key. In particular, the filtering engine 110 may map the key to a set of valid data types for values corresponding to the key in accordance with a predetermined mapping. For example, the filtering engine 110 may map the key "Name" to the corresponding value data type "alphabetical", indicating that the value corresponding to the key should have an alphabetical data type (e.g., "John Smith"). As another example, the filtering engine 110 may map the key "Date" to the corresponding value data type "temporal", indicating that the value corresponding to the key should have a temporal data type (e.g., "2-23-2019" or "17:30:22").

The filtering engine 110 determines whether the type of the non-key text is included in the set of valid types for values corresponding to the key. In response to determining that the type of the non-key text is included in the set of valid types for values corresponding to the key, the filtering engine 110 determines that the text enclosed by the bounding box represents a key-value pair. In particular, the filtering engine 110 identifies the non-key text as the value corresponding to the key. Otherwise, the filtering engine 110 determines that the text enclosed by the bounding box does not represent a key-value pair.

The set of valid keys and the mapping from valid keys to sets of valid data types for values corresponding to the valid keys may be provided by a user of the system 100 (e.g., through an API made available by the system 100).

After identifying key-value pairs 104 from the text 116 enclosed by respective bounding boxes 114 using the filtering engine 110, the system 100 outputs the identified key-value pairs 104. For example, the system 100 can provide the key-value pairs 104 to a remote user of the system 100 over a data communication network (e.g., using an API made available by the system 100). As another example, the system 100 can store data defining the identified key-value pairs in a database (or other data structure) accessible to the user of the system 100.

In some cases, a user of the system 100 may request that the system 100 identify the value corresponding to the particular key in the document (e.g., "Invoice #"). In these cases, rather than identifying and providing every key-value pair in the document, the system 100 may process the text 116 identified in respective bounding boxes 114 until the requested key-value pair is identified, and thereafter output the requested key-value pair.

As described above, the detection model 106 can be trained to generate bounding boxes which each enclose a respective key-value pair. Alternatively, rather than using a single detection model 106, the system 100 may include: (i) a "key detection model" that is trained to generate bounding boxes which enclose respective keys, and (ii) a "value detection model" that is trained to generate bounding boxes which enclose respective values. The system 100 can identify key-value pairs from the key bounding boxes and the value bounding boxes in any appropriate manner. For example, for each pair of bounding boxes that includes a key bounding box and a value bounding box, the system 100 can generate a "match score" based on: (i) the spatial proximity of the bounding boxes, (ii) whether the key bounding box encloses a valid key, and (iii) whether the type of the value enclosed by the value bounding box is included in a set of valid types for values corresponding to the key. The system 100 may identify the key enclosed by a key bounding box and the value enclosed by a value bounding box as a key-value pair if the match score between the key bounding box and the value bounding box exceeds a threshold.

FIG. 2A illustrates an example of an invoice document 200. A user of the parsing system 100 (described with reference to FIG. 1) may provide the invoice 200 (e.g., as a scanned image or a PDF file) to the parsing system 100.

FIG. 2B illustrates bounding boxes (e.g., 202, 204, 206, 208, 210, 212, 214, and 216) generated by the detection model 106 of the parsing system 100. Each of the bounding boxes is predicted to enclose textual data that defines a key-value pair. The detection model 106 does not generate a bounding box that encloses the text 218 (i.e., "Thank you for your business!") since this text does not represent a key-value pair. As described with reference to FIG. 1, the parsing system 100 uses OCR techniques to identify the text inside each bounding box, and thereafter identifies valid key-value pairs enclosed by the bounding boxes.

Figures 2C, 2D:
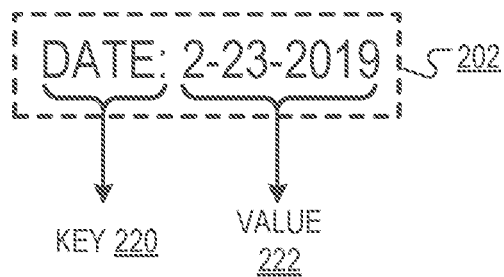
FIG. 2C illustrates a key and a value enclosed by a bounding box.
FIG. 2D illustrates the key-value pairs identified by the parsing system in the invoice.

FIG. 2C illustrates the key 220 (i.e., "Date:") and the value 222 (i.e., "2-23-2019") enclosed by the bounding box 202.

FIG. 2D illustrates the key-value pairs identified by the parsing system 100 in the invoice 200.

Figure 3:
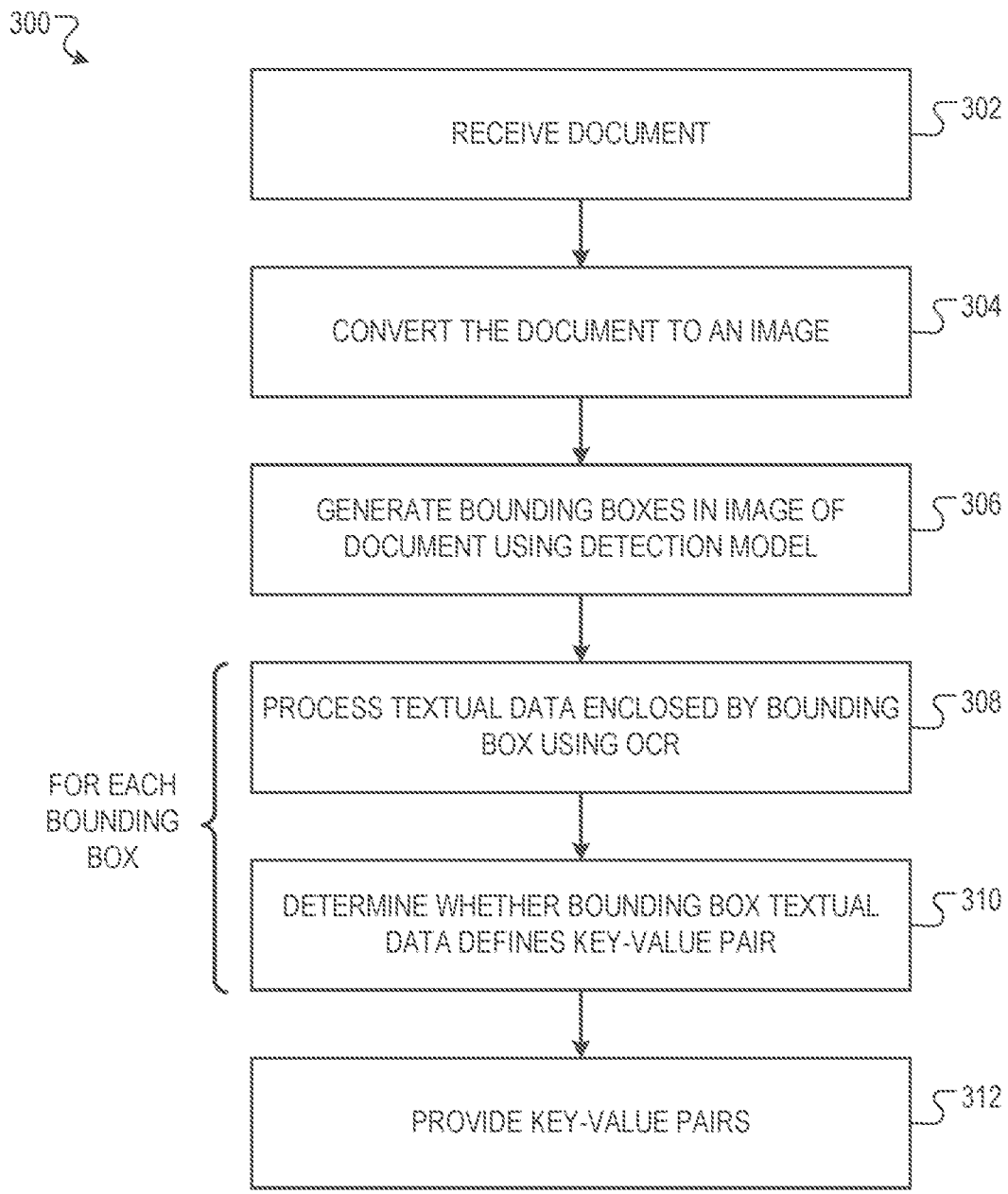
FIG. 3 is a flow diagram of an example process for identifying key-value pairs in a document.

FIG. 3 is a flow diagram of an example process 300 for identifying key-value pairs in a document. For convenience, the process 300 will be described as being performed by a system of one or more computers located in one or more locations. For example, a parsing system, e.g., the parsing system 100 of FIG. 1, appropriately programmed in accordance with this specification, can perform the process 300.

The system receives a document (302). For example, the system can receive the document as an upload from a remote user of the system over a data communication network (e.g., using an API made available by the system). The document can be represented in any appropriate unstructured data format, for example, as a PDF document or an image document (e.g., a PNG or JPEG document).

The system converts the document to an image, that is, an ordered collection of numerical values that represents the visual appearance of the document (304). For example, the image may be a black-and-white image of the document that is represented as a two-dimensional array of numerical intensity values.

The system provides the image of the document to a detection model that is configured to process the image in accordance with a set of detection model parameters to generate an output that defines one or more bounding boxes in the image of the document (306). Each bounding box is predicted to enclose a key-value pair including key textual data and value textual data, where the key defines a label that characterizes the value. The detection model may be a neural network object detection model that includes one or more convolutional neural networks.

The steps 308-310 are performed for each bounding box in the image of the document. For convenience, the steps 308-310 are described with reference to a given bounding box.

The system identifies the textual data enclosed by the bounding box using optical character recognition (OCR) techniques (308). In particular, the system uses OCR techniques to identify each alphabetical, numerical, or special character enclosed by the bounding box.

The system determines whether the textual data enclosed by the bounding box defines a key-value pair (310). For example, the system may determine whether the text enclosed by the bounding box includes a valid key from a predetermined set of valid keys. In response to determining that the text enclosed by the bounding box does not include a valid key from the set of valid keys, the system determines that the text enclosed by the bounding box does not represent a key-value pair. In response to determining that the text enclosed by the bounding box includes a valid key, the system identifies a "type" (e.g., alphabetical, numerical, temporal, or a combination thereof) of the portion of text enclosed by the bounding box which was not identified as the key (i.e., the "non-key" text). In addition to identifying the type of the non-key text, the system identifies a set of one or more valid types for values corresponding to the key. The system determines whether the type of the non-key text is included in the set of valid types for values corresponding to the key. In response to determining that the type of the non-key text is included in the set of valid types for values corresponding to the key, the system determines that the text enclosed by the bounding box represents a key-value pair. In particular, the system identifies the non-key text as the value corresponding to the key. Otherwise, the system determines that the text enclosed by the bounding box does not represent a key-value pair.

The system provides the identified key-value pairs for use in characterizing the document (312). For example, the system can provide the key-value pairs to a remote user of the system over a data communication network (e.g., using an API made available by the system).

Figure 4:
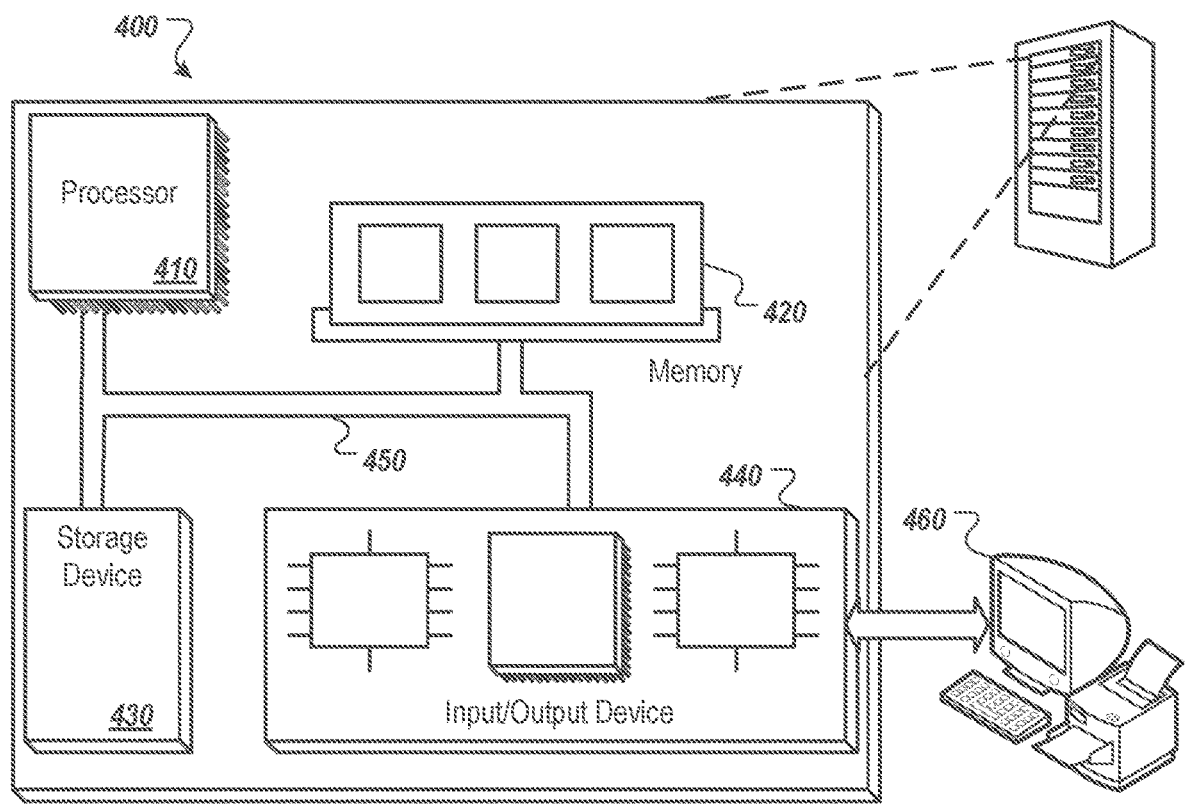
FIG. 4 is block diagram of an example computer system.

FIG. 4 is block diagram of an example computer system 400 that can be used to perform operations described previously. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (for example, a cloud storage device), or some other large capacity storage device.

The input/output device 440 provides input/output operations for the system 400. In one implementation, the input/output device 440 can include one or more network interface devices, for example, an Ethernet card, a serial communication device, for example, and RS-232 port, and/or a wireless interface device, for example, and 802.11 card. In another implementation, the input/output device 440 can include driver devices configured to receive input data and send output data to other input/output devices, for example, keyboard, printer and display devices 460. Other implementations, however, can also be used, such as mobile computing devices, mobile communication devices, and set-top box television client devices.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine, in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks: and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any implementation or on the scope of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving a request requesting the data processing hardware to characterize key-value pairs within an image, the image comprising a bounding box enclosing textual data within the image;
   determining whether a first portion of the textual data enclosed by the bounding box includes a key from a predetermined set of valid keys; and
   when the first portion of the textual data enclosed by the bounding box includes the key from the predetermined set of valid keys:
      identifying a second portion of the textual data enclosed by the bounding box, the second portion comprising non-key text of the textual data;
      identifying one or more valid types of non-key text associated with the key;
      determining whether a type of the second portion of the textual data is included in the one or more valid types of non-key text associated with the key;
      when the type of the second portion of the textual data is included in the one or more valid types of non-key text associated with the key, determining that the textual data enclosed by the bounding box defines a valid key-value pair; and
      providing the valid key-value pair.

2. The method of claim 1, wherein the operations further comprise providing the image to a detection model.

3. The method of claim 2, wherein the operations further comprise:
   receiving a document from a user; and
   converting the document to the image, wherein the image depicts the document.

4. The method of claim 2, wherein providing the image to the detection model comprises:
   identifying a particular class of the image;
   training the detection model on the particular class; and
   providing the image to the detection model trained to process images of the particular class.

5. The method of claim 2, wherein the detection model comprises a neural network model.

6. The method of claim 5, wherein:
   the neural network model is trained on a set of training examples, each training example comprising a training input and a target output;
   the training input comprises a training image; and
   the target output comprises data defining one or more bounding boxes in the training image that each enclose a respective valid key-value pair.

7. The method of claim 2, wherein determining whether the first portion of the textual data enclosed by the bounding box includes the key from the predetermined set of valid keys further comprises, when the first portion of the textual data enclosed by the bounding box does not include the key from the predetermined set of valid keys, determining that the textual data enclosed by the bounding box does represents an invalid key-value pair.

8. The method of claim 1, wherein identifying the one or more valid types of the non-key text of the textual data associated with the key comprises mapping the key to the one or more valid types for values corresponding to the key using a predetermined mapping.

9. The method of claim 8, wherein the predetermined set of valid keys and the predetermined mapping are provided by a user.

10. The method of claim 1, wherein determining whether the second portion of the textual data is included in the one or more valid types of non-key text associated with the key comprises:
   mapping the key to a temporal type of the second portion of the textual data; and
   indicating that a value corresponding to the key should have a temporal data type.

11. A system comprising:
data processing hardware; and
memory hardware in communication with the data processing hardware, the memory hardware storing instructions that when executed on the data processing hardware cause the data processing hardware to perform operations comprising:
  receiving a request requesting the data processing hardware to characterize key-value pairs within an image, the image comprising a bounding box enclosing textual data within the image;
  determining whether a first portion of the textual data enclosed by the bounding box includes a key from a predetermined set of valid keys; and
  when the first portion of the textual data enclosed by the bounding box includes the key from the predetermined set of valid keys:
    identifying a second portion of the textual data enclosed by the bounding box, the second portion comprising non-key text of the textual data;
    identifying one or more valid types of non-key text associated with the key;
    determining whether a type of the second portion of the textual data is included in the one or more valid types of non-key text associated with the key;
    when the type of the second portion of the textual data is included in the one or more valid types of non-key text associated with the key, determining that the textual data enclosed by the bounding box defines a valid key-value pair; and
    providing the valid key-value pair.

12. The system of claim 11, wherein the operations further comprise providing the image to a detection model.

13. The system of claim 12, wherein the operations further comprise:
  receiving a document from a user; and
  converting the document to the image, wherein the image depicts the document.

14. The system of claim 12, wherein providing the image to the detection model comprises:
  identifying a particular class of the image;
  training the detection model on the particular class; and
  providing the image to the detection model trained to process images of the particular class.

15. The system of claim 12, wherein the detection model comprises a neural network model.

16. The system of claim 15, wherein:
  the neural network model is trained on a set of training examples, each training example comprising a training input and a target output;
  the training input comprises a training image; and
  the target output comprises data defining one or more bounding boxes in the training image that each enclose a respective valid key-value pair.

17. The system of claim 12, wherein determining whether the first portion of the textual data enclosed by the bounding box includes they key from the predetermined set of valid keys further comprises, when the first portion of the textual data enclosed by the bounding box does not include the key from the predetermined set of valid keys, determining that the textual data enclosed by the bounding box does represents an invalid key-value pair.

18. The system of claim 11, wherein identifying the one or more valid types of the non-key text of the textual data associated with the key comprises mapping the key to the one or more valid types for values corresponding to the key using a predetermined mapping.

19. The system of claim 18, wherein the predetermined set of valid keys and the predetermined mapping are provided by a user.

20. The system of claim 11, wherein determining whether the second portion of the textual data is included in the one or more valid types of non-key text associated with the key comprises:
  mapping the key to a temporal type of the second portion of the textual data; and
  indicating that a value corresponding to the key should have a temporal data type.

* * * * *